(12) United States Patent
Nir

(10) Patent No.: US 11,910,038 B2
(45) Date of Patent: *Feb. 20, 2024

(54) CROP-BASED COMPRESSION OF VIDEOS

(71) Applicant: Nahum Nir, Jerusalem (IL)

(72) Inventor: Nahum Nir, Jerusalem (IL)

(*) Notice: Subject to any disclaimer, the term of this patent is extended or adjusted under 35 U.S.C. 154(b) by 22 days.

This patent is subject to a terminal disclaimer.

(21) Appl. No.: 17/521,815

(22) Filed: Nov. 8, 2021

(65) Prior Publication Data

US 2022/0070505 A1 Mar. 3, 2022

Related U.S. Application Data

(63) Continuation of application No. 17/324,234, filed on May 19, 2021, now Pat. No. 11,197,045.

(60) Provisional application No. 63/027,068, filed on May 19, 2020.

(51) Int. Cl.
| | |
|---|---|
| *H04N 21/2343* | (2011.01) |
| *H04N 21/2385* | (2011.01) |
| *H04N 21/24* | (2011.01) |
| *G06V 20/40* | (2022.01) |

(52) U.S. Cl.
CPC ..... *H04N 21/234345* (2013.01); *G06V 20/40* (2022.01); *G06V 20/46* (2022.01); *H04N 21/2385* (2013.01); *H04N 21/2402* (2013.01)

(58) Field of Classification Search
CPC .......... H04N 21/2385; H04N 21/2402; G06K 9/00711; G06K 9/3241
See application file for complete search history.

(56) References Cited

U.S. PATENT DOCUMENTS

| | | | | |
|---|---|---|---|---|
| 2010/0111196 A1* | 5/2010 | Lynch | ............... | G06T 7/12 |
| | | | | 375/E7.005 |
| 2014/0245367 A1* | 8/2014 | Sasaki | ............... | H04N 21/4402 |
| | | | | 725/109 |

* cited by examiner

*Primary Examiner* — Nnenna N Ekpo

(57) ABSTRACT

A method, system and product for compressing videos. The method comprising: obtaining a video that comprises a sequence of video frames, wherein the sequence of video frames comprises at least a first frame and a second frame, wherein the first frame is ordered before the second frame in the sequence of video frames; determining to preserve the first frame in its entirety; and in response to a determination to utilize a partial frame instead of the second frame: cropping the second frame to determine a cropped frame, wherein the cropped frame is smaller in at least one dimension than the second frame, wherein said cropping is based on an anchor location; whereby an alternative video can be constructed using the first frame and the cropped frame, wherein the alternative video does not include a remainder portion of the second frame in an explicit manner.

14 Claims, 4 Drawing Sheets

CROP-BASED COMPRESSION OF VIDEOS

CROSS-REFERENCE TO RELATED APPLICATION

This application is a continuation of an claims the benefit of U.S. application Ser. No. 17/324,234, entitled VIDEO COMPRESSION", which claims the benefit of provisional patent applications No. 63/067,842 filed May 19, 2020, titled "Efficient Video Encoding, Decoding and Streaming", both of which are hereby incorporated by reference in their entirety without giving rise to disavowment.

TECHNICAL FIELD

The present disclosure relates to video streaming in general, and to reducing video streaming bandwidth, in particular.

BACKGROUND

Media stream may be a multimedia that is constantly produced by a provider or by a producer and received by a consumer. The received media stream may be presented to an end-user while being delivered by the provider. The verb "to stream" may refer to the process of delivering or obtaining media in this manner; the term may refer to the delivery method of the medium, rather than the medium itself, and may be an alternative to file downloading, a process in which the consumer may obtain the entire file for the content before watching or listening to it.

A client end-user may use their media player to start playing digital video or digital audio content before the entire file has been transmitted. Distinguishing delivery method from the media distributed applies specifically to telecommunications networks, as most of the delivery systems are either inherently streaming (e.g. radio, television, streaming apps) or inherently non-streaming (e.g. books, video cassettes, audio CDs). For example, in the 1930s, elevator music was among the earliest popular music available as streaming media; nowadays Internet television is a common form of streamed media.

Live streaming may be the delivery of content in real-time such as live television broadcasts, online lectures, online meetings, or the like. Live internet streaming may require a form of source media (e.g. a video camera, an audio interface, screen capture software), an encoder to digitize the content, a media publisher, and a content delivery network to distribute and deliver the content. Live streaming does not need to be recorded at the origination point, although it frequently may.

BRIEF SUMMARY

One exemplary embodiment of the disclosed subject matter is a method comprising: obtaining, from a first device, a video, wherein the video comprises a sequence of video frames, wherein the sequence of video frames comprises at least a first frame and a second frame, wherein the first frame is ordered before the second frame in the sequence of video frames; determining to preserve the first frame in its entirety; and in response to a determination to utilize a partial frame instead of the second frame: cropping the second frame to determine a cropped frame, wherein the cropped frame is smaller in at least one dimension than the second frame, wherein said cropping is based on an anchor location; whereby an alternative video can be constructed using the first frame and the cropped frame, wherein the alternative video does not include a remainder portion of the second frame in an explicit manner.

Optionally, the method comprises generating the alternative video based on the first frame, the cropped frame and the anchor location; and storing the alternative video in a data storage.

Optionally, the method comprises constructing an alternative second frame based on the cropped frame and based on the first frame, wherein said constructing is performed based on the anchor location; and generating the alternative video, wherein the alternative video comprises the first frame and the alternative second frame.

Optionally, the method comprises transmitting the first frame to a second device; and transmitting the cropped frame and the anchor location to the second device, whereby avoiding to transmit a remainder portion of the second frame to the second device.

Optionally, the determination to utilize the partial frame instead of the second frame is performed based on a network condition associated with the first device.

Optionally, the method comprises, at the second device: receiving the first frame; receiving the cropped frame and the anchor location; constructing an alternative second frame based on the cropped frame and based on the first frame, wherein said constructing is performed based on the anchor location; and displaying an alternative video that comprises the first frame and the alternative second frame.

Optionally, the second frame comprises a background and one or more objects of interest; wherein the determination to utilize the partial frame comprises: identifying the one or more objects of interest within the second frame; wherein the method comprises: determining a bounding shape within the second frame, wherein the bounding shape comprises the one or more objects of interest, wherein the bounding shape is determined based on one or more locations of the one or more objects of interest; and wherein said cropping comprises: cropping the second frame based on the bounding shape.

Optionally, the bounding shape is a minimal bounding rectangle that comprises the one or more objects of interest, wherein any other rectangle comprising the one or more objects of interest is larger than the minimal bounding rectangle.

Optionally, said identifying the one or more objects of interest comprises: detecting objects within the second frame; determining, for each detected object, a corresponding interest level; and identifying detected objects having the corresponding interest level above a threshold as the one or more objects of interest.

Optionally, said identifying the one or more objects of interest within the second frame is performed based on a previous identification of the one or more objects of interest or one or more objects related thereto in preceding frames.

Optionally, said previous identification of the one or more objects of interest comprises: obtaining, by the second device, a frame from the first device, wherein the frame precedes the first frame and the second frame in the sequence of video frames; detecting a set of objects in the frame, wherein the set of objects comprises the one or more objects of interest or one or more objects related thereto; and tracking a location of the one or more objects within frames succeeding the frame.

Optionally, the first frame comprises the background.

Optionally, the one or more objects of interest appearing in the second frame comprises an object. The method comprises determining an activity level for the object;

wherein the determination to utilize the partial frame instead of the second frame is performed based on the activity level of the object.

Optionally, the second frame comprises the object and a second object; wherein the method further comprises: determining a second activity level for the second object, wherein the activity level of the object is above a predetermine threshold, wherein the second activity level of the second object is below the predetermined threshold; and wherein the bounding shape comprises the object and excludes the second object.

Optionally, the activity level of the object is determined based on a difference between a location of the object in the second frame with respect to a location of the object in the first frame.

Optionally, the one or more objects of interest comprise a first object and a second object; wherein the bounding shape comprises a first bounding shape and a second bounding shape, wherein the first bounding shape is separated from the second bounding shape; wherein said determining the bounding shape comprise: determining the first bounding shape within the second frame based on locations of the first and second objects, wherein the first bounding shape comprises the first object and excludes the second object; determining the second bounding shape within the second frame based on locations of the first and second objects, wherein the second bounding shape comprises the second object and excludes the first object; whereby an area of the first bounding shape and the second bounding shape is smaller than any other bounding shape comprising the first object and the second object; and wherein said cropping comprises: cropping the cropped frame based on the first and second bounding shapes, whereby the cropped frame comprises at least two separate portions.

Optionally, the method comprises selecting a subset of frames from the sequence of video frames to be considered for cropping, wherein the subset comprises the first frame and the second frame, wherein each frame that is excluded from the subset of frames, is utilized in its entirety.

Another exemplary embodiment of the disclosed subject matter is an apparatus having a processor and memory, wherein said memory is configured to retain a video, wherein the video comprises a sequence of video frames, wherein the sequence of video frames comprises at least a first frame and a second frame, wherein the first frame is ordered before the second frame in the sequence of video frames; wherein said processor is configured to: determine to preserve the first frame in its entirety; and in response to a determination to utilize a partial frame instead of the second frame, crop the second frame to determine a cropped frame, wherein the cropped frame is smaller in at least one dimension than the second frame, wherein the cropping is based on an anchor location; whereby an alternative video can be constructed using the first frame and the cropped frame, wherein the alternative video does not include a remainder portion of the second frame in an explicit manner.

Yet another exemplary embodiment of the disclosed subject matter is a system comprising the apparatus and a second device comprising a processor, wherein the apparatus and said second device are connectable over a network; wherein the apparatus is configured to transmit the first frame, the cropped frame and the anchor location to said second device, wherein said second device is configured to: receive the first frame; receive the cropped frame and the anchor location; and construct an alternative second frame based on the cropped frame, based on the first frame and based on the anchor location, thereby generating an alternative video that comprises the first frame and the alternative second frame.

Yet another exemplary embodiment of the disclosed subject matter is a computer program product comprising a non-transitory computer readable medium retaining program instructions, which program instructions, when read by a processor, cause the processor to: obtain a video, wherein the video comprises a sequence of video frames, wherein the sequence of video frames comprises at least a first frame and a second frame, wherein the first frame is ordered before the second frame in the sequence of video frames; determine to preserve the first frame in its entirety; and in response to a determination to utilize a partial frame instead of the second frame, crop the second frame to determine a cropped frame, wherein the cropped frame is smaller in at least one dimension than the second frame, wherein the cropping is based on an anchor location; whereby an alternative video can be constructed using the first frame and the cropped frame, wherein the alternative video does not include a remainder portion of the second frame in an explicit manner.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
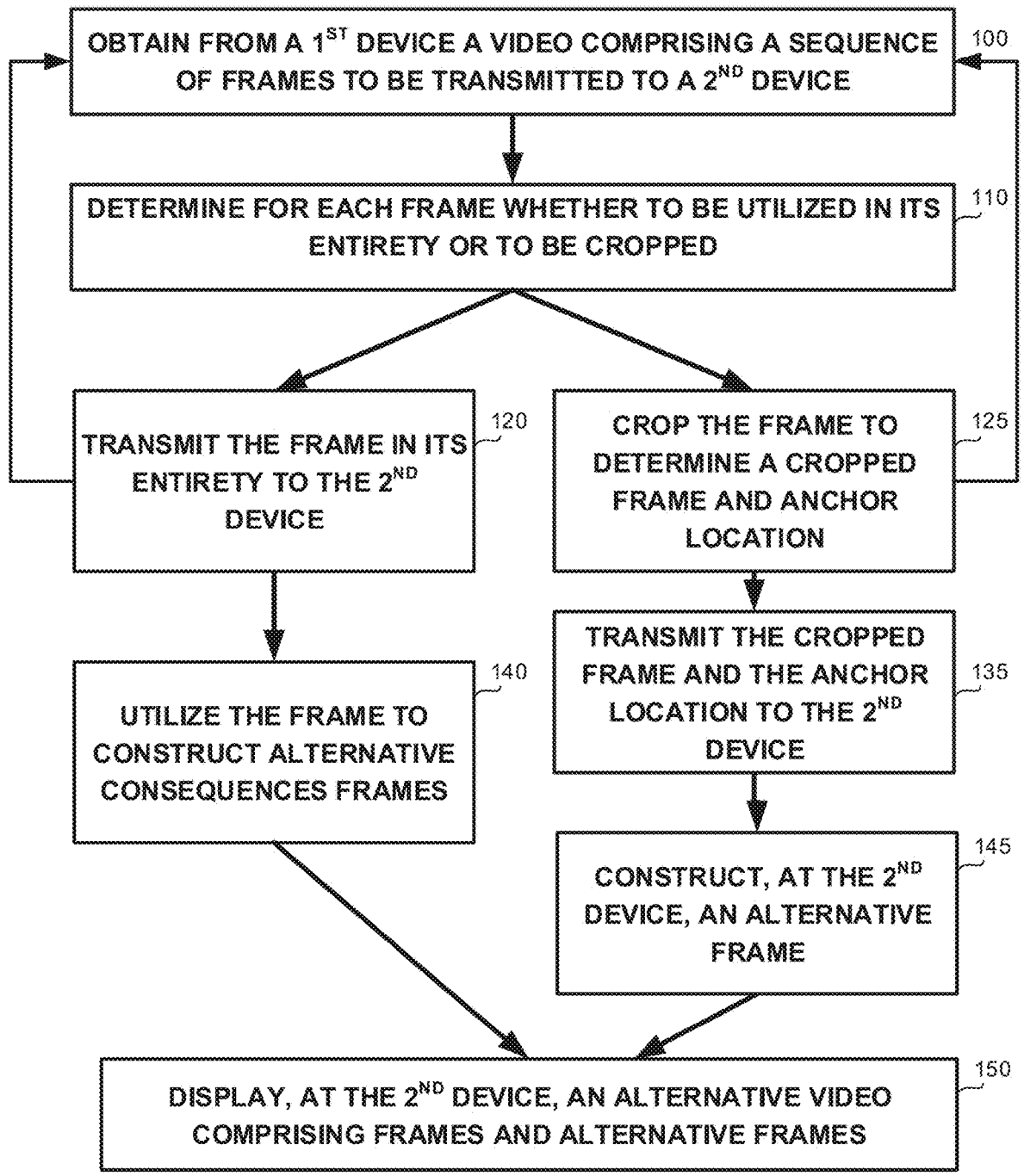
FIGS. 1A and 1B show flowchart diagrams of a method, in accordance with some exemplary embodiments of the disclosed subject matter.

One technical problem dealt with by the disclosed subject matter is to efficiently compress a video. Efficient compression may be useful for reduction of storage required to retain the video, bandwidth required to transmit the video, or the like. In some cases the video may be streamed to a consumer device. Different challenges may be faced when streaming content on the Internet, and specifically in live streaming. Devices with Internet connection lacks sufficient bandwidth may experience stops, lags, or slow buffering of the content. Additionally or alternatively, the connection may suffer from network latency, packet loss, or the like, causing delays in streaming. Devices lacking compatible hardware or software systems may be unable to stream certain content, may be unable to stream the content in a high quality, or the like.

In some exemplary embodiments, the video may be streamed from a server such as YouTube™, a Video on Demand (VOD) service, or the like. Additionally or alternatively, the video may be streamed from one consumer device to other end devices, such as from a first smartphone to another smartphone, a from a first user computing device to another, from one computing device to a plurality of computing devices, or the like. In some exemplary embodiments, the video may be streamed in a video chat such as Zoom™, Skype™, WebEx™, or the like. Additionally or alternatively, the video may be streamed in an online class, such as a Yoga class, an online lecture, or the like.

In some exemplary embodiments, in order to generate the video stream, a capturing device, such as a camera, a webcam, an infra-red camera, or the like, may be utilized. The capturing device may be integrated in a user device, such as smartphone, a personal computer, a computing device, or the like. Additionally or alternatively the capturing device may be a camera observing an area, such as a street camera, a security camera, or the like. Additionally or alternatively the capturing device may be integrated in an Internet of Things (IoT) device, a satellite camera, or the like. The capturing device may be configured to output a sequence of frames.

In some exemplary embodiments, the video may be streamed to one or more end devices such as a laptop, a smartphone, a personal computer, or the like. Additionally or alternatively an end device may be a server, a satellite, or the like, that provides the video to one or more consumer devices.

Another technical problem dealt with by the disclosed subject matter is to reduce the amount of data that may be transmitted in a video stream, without affecting the quality or resolution of the transmitted video, in a manner that can be detected by the end user. In some cases, a video content may be available in several resolutions. A lower resolution may be utilized in case that there is insufficient bandwidth while a higher resolution may be utilized in case there is sufficient bandwidth. Videos with lower resolutions may be undesired by the users, as suffering from bad quality, or the like.

In some exemplary embodiments a video stream may be utilized in an online meeting, in an online lecture, or the like. In such embodiments, the background may not change. Additionally or alternatively, slides or electronic presentation may be displayed in the video, such as a lecturer displaying slides, or the like. The slides may change less frequently, such as every half a minute, every minute, or the like. It may be desired to stream only the changing portions of a frame.

Yet another technical problem dealt with by the disclosed subject matter is to provide a consistent streaming of a video for a consumer having a low download rate. A consistent streaming may refer to a streaming in which the download rate of the media is not larger than the play rate of the media. In those embodiments, a streaming provider may automatically detect the bandwidth available for the media consumer. The streaming provider may change a Frame Per Second (FPS) parameter of the media in order to assure that the streaming is consistent. Such change may affect the quality of the downloaded video.

One technical solution is to determine, for each frame of the video, separately, whether to preserve it in its entirety or utilize only portions thereof that comprise objects of interest in accordance with context of the video and that have changed from the previous frame. In some exemplary embodiments, instead of utilizing an entire frame to the end device, a cropped version, with the relevant portions, e.g., portions comprising the objects of interest, changes, or the like, may be transmitted. For example, instead of streaming the original video, some frames may be analyzed to determine if to transmit it in its entirety or only a portion thereof. In case it is determined that the entire frame is not to be preserved, a cropped frame may be created and transmitted, thereby reducing the amount of data to be transmitted.

In some exemplary embodiments, each frame of the video may be analyzed. Additionally or alternatively, only a portion of the frames may be analyzed in order to spare resources (e.g., CPU, power, or the like). As an example, only frames with an activity level above a predetermined threshold may be analyzed. As another example, every other frame may be analyzed, prevent analyzing for a predefined duration such as half a second or predetermined number of frames, or the like.

In some exemplary embodiments, the video may comprise a sequence of video frames to be transmitted from a first device to a second device. The sequence of video frames may comprise at least a first frame and a second frame, such that the first frame is ordered before the second frame in the sequence of video frames. A determination may be performed, for each frame, whether to transmit the frame in its entirety or a cropped version thereof. As an example, in response to a determination to transmit the first frame in its entirety, the first frame may be transmitted from the first device to the second device in its entirety. On the other hand, in response to a determination to transmit a partial frame instead of the second frame, the second frame may be cropped to determine a cropped frame. The cropped frame may be transmitted to the second device instead of the second frame. It may be appreciated that the cropped frame is smaller in at least one dimension than the second frame.

In some exemplary embodiments, the analyzed frame may comprise one or more objects. Additionally or alternatively, frames may comprise a background. In some cases, some of the objects may be considered as objects of interest, while other may be considered as not interesting objects, information regarding which may be less important to the viewer. An object of interest may be an object within video having a high relevancy to a context of the video, to the viewer, or the like. In some cases, tracking changes in the object of interest may be required in order for the viewer to consume the video. In some cases, a viewer viewing the video may be focused on the objects of interest and may be less interested in other objects, as well as the background. For example, in a video of children in kindergarten signing, the adults who may appear in the video may not be considered as objects of interest. As another example, the viewer's son may be considered as an object of interest, as opposed to another child appearing in the video, who may be considered an object of interest to a different viewer. In order to provide the viewer with substantially the same experience as viewing the original video, or the real captured environment, the presented video may include sufficient information regarding the objects of interest, thereby providing potentially different, but non-substantively-affected media to the end user. In some exemplary embodiments, identification of objects of interest may be performed based on a context of the video or the media stream. In some exemplary embodiments, the context may include time of day, location information, objects referred to by participants in the video, type of video, roles of participants in the video, or the like. As an example, in case that the media stream is an online lecture, the object of interest may be the lecturer. As another example, when a participant is speaking, she may be considered as "object of interest", while when she is silent she may be considered as "not interesting". As yet another example, if the audio of the video mentions a specific object appearing in the frame, that object may be considered as "object of interest" after being mentioned and for a given timeframe thereafter (e.g., 10 seconds 30 seconds, 1 minute, or the like). Additionally or alternatively, an object that changes its location substantially within a frame in a subsequence of the video may be considered as an object of interest. For example, if over the duration of 1 minute, the object's center of mass moves over 5% of the width of the frame, the height of the frame, or the like, it may be considered as an "object of interest". As an example, a person that does not move from one frame to another may not be an object of interest, while another object such as a ball, a pet, or the like, that is located in a substantially different location within the frame with respect to the previous frame, may be an object of interest. In some exemplary embodiments, an object in which there is substantial change may be considered "an object of interest", as the viewer may be drawn to such object. For example, a cat changing its color from black to white, may be considered "object of interest" due to the substantial change in pixel information representing the object in two successive frame or in two frames that are separated by a predetermined number of interviewing frames.

In some exemplary embodiments, cropping the frame may be performed based on a location of the objects of interest within the video. The cropped frame may be required to comprise the objects of interest in order not to affect displaying such objects at the end device. The producer may identify one or more closed curved defining one or more bounding shapes that encompass the one or more objects of interest. In some exemplary embodiments, each object of interest of the one more objects of interest may be associated with at least one bounding shape. In some exemplary embodiments, there may be a one to one relation between the one or more objects of interest and the one or more bounding shapes. Additionally or alternatively, a single bounding shape may comprise more than one object of interest. The cropped frame may be generated by cropping the frame to the size and shape of the bounding shapes comprising the objects of interest. In some exemplary embodiments, each bounding shapes may be a minimal bounding shape that can comprise the respective object of interest. The shape of the minimal bounding shape may be determined based on the type of the object of interest, in a manner that minimized the amount of pixels in the bounding shape that are not pixels of the object of interest. As an example, the minimal bounding shape of a head of person may be an ellipse while the minimal bounding shape of a body of a person may be a rectangle. In some cases, the bounding shape may be of particular geometric shape, such as a polygon, a rectangle, a circle or the like. The minimal bounding shape may be a minimal bounding shape of the particular shape, such as the minimal bounding rectangle that encompasses the object of interest. It may be appreciated that minimal bounding shapes may be utilized, in order to reduce the amount of un-needed pixels transmitted to the second device and thus decreasing the bandwidth required to transmit the frame. In some cases, the bounding shape may be defined as having a minimal area, such as at least 4,096 (64×64) pixels, 16,384 (128×128), or the like. In some cases, the minimal area may be defined based on a relative size to the frame size (e.g., at least 5% of the area of the frame, at least 3% of the width of the frame, at least 10% of the height of the frame, or the like). In case the shape is smaller than a predetermined threshold, the shape may not be considered as encompassing an object of interest.

In some exemplary embodiments, an activity level of an object may be determined. As an example, the video may show a play enacted by two participants. The frame may comprise images of two people (e.g., the participants). A first person may talk and move while a second person may sit still and watch the first person. Both the first person and the second person may be determined to be objects. However, in view of their activity, each object (e.g., person) may be associated with a different activity level. In the example above, the first person may be associated with a relatively high activity level, while the second person may be associated with a relatively low activity level. The determination of whether the object is an object of interest may be based on the activity level of the object being above a threshold. In the example above, the first person may be considered an object of interest, while the second person may not be considered as an object of interest. In some cases, the activity level of the object may be determined based on activity in a sequence of frames, such as representing a predetermined time window before the frame being analyzed, a predetermined time window after the frame being analyzed, combination thereof, or the like. For example, an activity level of an object in a frame may depend on the movement or other activities associated with the object within 2 seconds before the frame, depend on the movement or other activities associated with the object within 3 second after the frame, depend on movement or other activities associated with the object 1.5 seconds before the frame and 1.5 second after the frame, or the like. In some exemplary embodiments, the disclosed subject matter may relate to any form of activity that is associated with the object, such as for example, change in visual representation, movement or other position and posture change, audio associated therewith (e.g., speaking or causing a notable sound), or the like. In case that an object does not move much, the difference in size and position of the object within the frame and the previous frame may not be noticeable to a human eye, and may not be required to be transmitted in the cropped frame.

Additionally or alternatively, an interest level may be determined for each object in the frame that is potentially an object of interest and that is being analyzed. The interest level may be determined based on a context of the video, based on the activity level of the object, based on the number of previous frames the object appeared in, or the like. Objects associated with an interest level above a predetermined threshold may be considered as objects of interest. In some exemplary embodiments, a background of the video may appear as it is changing due to an object that is moving. However, in the generated alternative frames, the background may be unchanged, while only objects of interest may be updated. It may be determined to periodically retain the entire frame. For example, the provider of the video may periodically transmit an entire frame to the consumer of the video. By periodically obtaining the entire frame, the consumer may be able to construct the frame (with relatively minor alterations) and maintain the image of the object of interest with the updated background.

In some exemplary embodiments, an object of interest may be comprised by one or more other objects of interest. As an example, the object of interest may be a screen viewing a slide show, and comprises another object of interest such as the content of the slide, a notes box provided by the lecturer, or the like. The bounding shape determined to be comprised by the cropped frame may be based on the external object of interest comprising the other objects. Additionally or alternatively, different overlapping objects of interests may be associated with different activity levels. The bounding shape determined to be comprised by the cropped frame may be based on the object with the highest activity level, based on objects with activity levels above the predetermined threshold, or the like. Referring to the above example, the activity level of the screen without the content may be below the predetermined threshold, while the activity level of an object within the slide may be above the predetermined threshold. Accordingly, the bounding shape may be determined based on the object within the slide and may encompass only a portion of the smart board. In some exemplary embodiments, an anchor location of the bounding shape within the frame may be determined and utilized to construct an alternative video based thereon, such as by the consumer of the video or other end device. The anchor location may be indicative of a location of the bounding shape within the frame, such as by comprising coordinates of the bounding shape, pixels location of one or more corners of the bounding shape, or the like. As an example, the anchor location may be the (X,Y) coordinates of the top left corner of the bounding rectangle shape. In other cases, the anchor location may provide an absolute location of another corner of the bounding rectangle within the full frame. Additionally or alternatively, the anchor location may comprise additional description related to the bounding shape, such as the type of the shape (e.g. rectangle, eclipse, or the like), a position of the bounding shape within the frame, identifier of the object of interest within the bounding shape, or the like. The description may be utilized by the end device to construct the entire frame, or an alternative version thereof. In some exemplary embodiments, an additional transmission channel between the producer and the end device may be allocated for sending the anchor location. The anchor location of each encoded frame may be provided with a frame number, allowing the end device to synchronize the anchor location with an encoded frame received on another channel. In some exemplary embodiments, the additional channel may utilize User Datagram Protocol (UDP). UDP may provide better throughput compared to other protocols. However, a packet may be lost, may arrive out of order, or the like. In those embodiments, the alternative frame may be constructed based on a previous packet comprising an anchor location of that bounding shape.

In some exemplary embodiments, Real Time Protocol (RTP) may be utilized. RTP may provide a channel for transmitting packets comprising media. An RTP packet may comprise a header and a payload. The header may comprise information regarding the location of a frame within the media stream, allowing to reconstruct the media stream in case that packets are arriving out of order. The payload may comprise a frame, an encoded frame, or the like. In some exemplary embodiments, the header may comprise the size and position of the bounding shape, other information related to the object of interest, or the like.

In some exemplary embodiments, the frame may be cropped to a rectangle. The anchor location representing the rectangle may be a top left corner and bottom right corner, yielding that four integers may be added to the RTP header. As another example, the dimensions of the rectangle may be extractable from the cropped frame, and two integers representing the top left corner position may suffice. Additionally or alternatively, the top left corner, the height and width of the rectangle may be transmitted. Additionally or alternatively, the frame may be cropped to a square. In that case, the cropped frame may be represented by a corner and a size of the square. In some exemplary embodiments, the size and position may be added to the Header Extension of the RTP header.

In some exemplary embodiments, the disclosed subject matter may be utilized in order to encode and decode a media stream such as an action movie, a basketball match, or the like. The media stream may comprise multiple objects of interest, such as above 5, 10, 100, or the like. Additionally or alternatively, the media stream may comprise an object of interest that may change in location and shape in a rate the is above a threshold, such as a person that is moving towards a camera. Additionally or alternatively, the media stream may encode for static use such as for downloading. In those embodiments, each frame may comprise a header. The header may comprise a length, a number of objects of interest, a description of each object of interest, or the like.

In some exemplary embodiments, the provider (e.g., the first device streaming the video) may encode the cropped frame and may provide the encoded cropped frame to the consumer (e.g., the second device viewing the video). Additionally or alternatively, the provider may store the cropped frame in a data repository.

In some exemplary embodiments, the provider may be configured to generate an alternative video that comprises original frames and alternative frames generated based on cropped frame, and transmit the alternative frame to the end device or consumer. Additionally or alternatively, the provider may provide each frame or cropped frame separately to the consumer, where the alternative video is generated at the consumer side by constructing alternative frames based on cropped frames and frames preceding thereof.

In some exemplary embodiments, the frames and the cropped frames may be compressed, such as using lossy compression, lossless compression, or the like, before being transmitted or stored. It is noted that for the purposes of the present disclosure, a frame that is compressed in its entirety (e.g., not by cropping pixels therefrom) may be considered the same as the non-compressed version of the same frame. Similarly, a compressed cropped frame, is a compressed version of the cropped version, that is compressed for purpose of transmission, and may be considered the same as the original, uncompressed, cropped frame. Hence, in an embodiment in which the frames (full or cropped) are compressed using lossy compression, and although an uncompressed version is obtained when reconstructing the video, the frames in the alternative video that were not cropped may be considered as identical to the original uncropped frame, even if technically they are not.

One technical effect of utilizing the disclosed subject matter is reducing the resources and bandwidth utilization required for video streaming in general and in live streaming particularly, without massively affecting the quality of the viewer's experience. As the cropped frames provided to the end device comprise the objects of interest, changes and motions of such objects may continuously be streamed to the end device without being affected. The portions that are excluded from the cropped frame may relate to elements that are static, unchanged, irrelevant to the context of the video, and thus even if affected, such affection may not be detected by the end user.

In some cases, the disclosed subject matter may be utilized to generate an alternative video to be retained locally or transmitted after being constructed, so as to reduce required bandwidth or storage. In some cases, encoders may use data from other frames to decompress the video, such as p-frames, b-frames, or the like. Hence, the fact that the alternative frames are generated based on previous frames as well as cropped addition thereto may enable such encoders to provide a higher amount of data compression when compared to the compression of the original video.

Another technical effect is enabling is to encode static content, such as content available for downloading, saving a video statically to a computing device, or the like, frame by frame, utilizing the disclosed solution, thereby reducing the amount of downloaded data. The size of the downloaded video file may be smaller than the original static content without utilizing the disclosed subject matter.

It is noted that human vision is imperfect, and focus of attention is of importance to the manner in which an image is perceived. In some cases, peripheral information may be ignored by the human mind and may be completed even if absent. The disclosed subject matter may make use of such properties of the human vision mechanism to reduce information used to present the video to the human viewer without adversely affecting her experience.

The inventor has implemented an embodiment of the disclosed subject matter, and exemplified that a video in which a TV newscaster is speaking, and having a relatively non-changing background, is compressed from an original file of 44 megabytes to an encoded version of 2,646,988 Bytes, while encoding the file without utilizing the disclosed subject matter is an encoded version of 6,232,861 Bytes, reducing the size of the file in more than 50%, while providing the user with an experience that is identical for all relevant purposes. In this embodiment, the object of interest is the face of the TV newscaster. The encoded video utilizes the disclosed subject matter comprises a cropped video comprising the TV newscaster of size of 2,644,061 Bytes, one full frame from the original file of size of 2,923 Bytes and a single anchor location of size of 4 bytes. As the TV newscaster movement during the video is below a threshold, the cropped video, a single anchor location and a single full frame are sufficient to construct the entire video. It is noted the single frame is resized for further efficiency. The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1A showing a flowchart diagram of a method, in accordance with some exemplary embodiments of the disclosed subject matter. In the embodiment exemplified in FIG. 1A, the video is being streamed from a first device to a second device. However, the disclosed subject matter is not limited to such scenario, and the video may be manipulated on a same device without being streamed. In some cases, the video may be manipulated and retained for future usage. Additionally, or alternatively, the video may be manipulated and the alternative video that is generated may be provided to a streaming module that is unaware of the manipulation and is not involved in performing such manipulation. Such streaming module may utilize other codecs to perform encoding and decoding of the video to be streamed.

On Step 100, a frame may be obtained from a first device. The frame may be comprised by a sequence of video frames of a video. The video may be configured to be transmitted to a second device. In some exemplary embodiments, the video may be obtained by utilizing a camera, a visual recording device, or the like. Additionally or alternatively, the frame may be comprised by a media stream obtained by a media stream producer. The media stream producer may be configured to transmit the media stream from the first device or an associated device therewith, to the second device. Additionally or alternatively, the media stream producer may be installed on the first device and utilized to transmit the media stream to other external devices such as the second device.

It may be noted that the frames are obtained in accordance of an order thereof in the sequence of frames of the video or the media stream. As an example, given a video configured to be transmitted from the first device to the second device, that comprises a sequence of video frames comprising a first frame and a second frame, such that the first frame is ordered before the second frame in the sequence of video frames; the first frame may be obtained and handled before the second frame.

On Step 110, a determination whether to transmit the frame in its entirety, or a partial version thereof, may be performed. In some exemplary embodiments, the determination may be performed based on one or more properties of the frame, such as location of objects of interest within the frame, activity level of objects, changes related to objects with respect to previous frames, or the like. Steps 111-114 in FIG. 1B expand Step 110.

In some exemplary embodiments, Step 110 may be skipped, or may be performed only in response to a determination to analyze the frames. The determination to analyze the frame and perform Step 110, may be performed based on analysis of previous frames, may be performed based on a periodic manner, or the like.

In some cases, some analysis may require relatively substantial computational resources. For example, object detection in a frame may be relatively expensive in CPU and power terms. Hence, in some cases, the disclosed subject matter may skip the object-based analysis for some frames and preserve the frame in its entirety without analyzing the content of the frame itself. Additionally, or alternatively, if the activity level of the associated object of interest (e.g., an object having a high interest level but relatively low activity level) is below a threshold, the frame may be cropped based on a previous detection. In such a case, the construction of the alternative frame may be based on the cropped frame and the previous anchor location that was determined in the previous detection. As can be appreciated, the frames to be analyzed are a subset of frames that are selected from the sequence of frames that constitute the video. In some cases, the determination which frames to analyze and which to avoid analyzing may be based on static criteria, such as periodic analysis of every i-th frame (e.g., every second frame is analyzed, every third frame is not analyzed, or the like). In some cases, the static criteria may be determined based on the application utilizing the disclosed subject matter. For example, online support video may be handled differently than a video chat. In some cases, the determination may be made based on the content of the frame itself, or based on other dynamic criteria. As an example, if two consecutive frames are substantially identical, the second frame of the two may not be analyzed to avoid object detection costs, and potentially rely on other compression and encoding techniques that would compress the data based on the similarity of the two consecutive frames. A real-world example of such a scenario may be a yoga lesson, during which there may be a relatively long period of time (e.g., 15 minutes) of meditation in which there is minimal movement. During such period, the object-based analyses may be avoided to reduce required CPU and power resources. After such mediation period, there may be plenty of movement during a short time (e.g., 5 minutes).

In some exemplary embodiments, the determination to transmit a partial frame instead of the entire frame may be performed based on available data bandwidth between the first device and the second device, based on connectivity status, packet loss, latency, packet jitter, or other network conditions.

Additionally or alternatively, the determination to transmit the partial frame instead of the frame may be performed based on a determination of the existence of objects of interest in the frame. In some cases, the objects of interest may be identified based on the activity levels thereof, based on determined change in data relating thereto (e.g. change of pixels' values, change of location, or the like), based on comparison between the activity level of an anchor object with respect to a previous frame, based on the average activity level being above a predetermined threshold, or the like.

Additionally or alternatively, the determination to transmit the partial frame instead of the entire frame may be performed while taking into consideration the potential data reduction gained from the omission of a portion of the frame. In some cases, the usage of a partial frame may adversely affect computation time as the construction of an alternative frame using the partial frame may require processing resources. As an example, in case the portion of the frame to be preserved is above a threshold of 95% of the pixels of the frame, it may be determined to preserve the entire frame and avoid the utilization of a partial frame.

Additionally, or alternatively, the determination to transmit the partial frame may be based on decisions made regarding previous frames and their content. For example, if no previous frame that includes the current background (or some relatively minor variation thereof) was previously preserved in its entirety, it may be determined to preserve the present frame in its entirety as it cannot be manipulated together with a previous frame to construct a similar alternative frame.

In response to a determination to transmit the entire frame, on Step 120, the frame may be transmitted in its entirety to the second device. In some exemplary embodiments, the frame may be utilized by the second device to construct alternative frame of partial frames obtained later (Step 140).

Additionally or alternatively, in response to a determination to transmit a partial frame, on Step 125 a cropped frame may be determined.

In some exemplary embodiments, the frame may comprise one or more objects of interest and a background. As an example, in case that the media stream is an online lecture, the object of interest may be the lecturer. Locations of the one or more objects may be tracked and identified within the frame, and an anchor location of a bounding shape may be determined based thereon.

In some exemplary embodiments, the cropped frame may be generated by cropping the frame to a minimal size and shape that comprises the one or more objects of interest. It may be noted that in some cases the cropped frame may comprise more than one separated curved area. The cropped frame may be smaller in at least one dimension than the second frame. As an example, the cropped frame may not comprise the background, unchanged elements, irrelevant elements, or the like. Additionally or alternatively, the cropped frame may be generated based on the bounding shapes determined in Step 113 of FIG. 1B.

In some exemplary embodiments, the cropped frame may be encoded, such as using an h264 encoder, h263 encoder, or the like. A respective decoder may be utilized by the second device in order to decode the relevant frame.

On Step 135, the cropped frame may be transmitted to the second device instead of the frame in its entirety. In some exemplary embodiments, the cropped frame and the anchor location may be transmitted to the second device, whereby avoiding to transmit a remainder portion of the second frame to the second device.

In some exemplary embodiments, a Session Description Protocol (SDP) may be utilized for streaming media from the first device to the second device. An SDP offer comprising the anchor location, a description of the object of interest, a description of the associated bounding shape, or the like, may be utilized.

On Step 145, upon receiving the cropped frame and the anchor location by the second device, an alternative frame may be constructed based thereon. In some exemplary embodiments, the alternative frame may be constructed based on a frame previously received by the second device in its entirety, such as on Step 140. The construction of the alternative frame may be performed by overlapping the cropped frame over the previously received frame at a location defined by the anchor location. In some exemplary embodiments, the locations of the bounding shapes within the alternative frame may be determined based on information provided within the anchor location. Additionally or alternatively, other portions of the alternative frame may be constructed based on associated pixels, e.g., pixels at the same coordinates, from previous frames, which were received in their entirety or constructed based on cropped frames as well.

Additionally or alternatively, the alternative frame may be constructed based on the SDP offer comprising the anchor location or the description.

Steps 100-145 may be repeated until obtaining the whole sequence of frames. It may be appreciated that an entire frame may be transmitted in its entirety to the second device at least every given period, such as every 10 frames, every 50 frame, every 100 frames, or the like.

In some exemplary embodiments, the second device may obtain a plurality of frames. Some of this plurality may be original frames as captured by the first device, other may be cropped frames as generated in Step 125. Additionally or alternatively, some of this plurality may be encoded original frames, encoded cropped frames, or the like. The second device may be configured to construct an alternative frame based on a cropped frame, based on the anchor location, based on previous frames obtained in their entirety, or the like.

In some exemplary embodiments, the frames and the cropped frames may be compressed before being transmitted to the second device. The compression may be may be performed using a codec such as H265, H264, H263, Quick-Time™, ASUS V1™, Bink™ video, Motion JPEG™, MPEG-4™, On2 VP3™, On2 VP8™, or the like. A decoder may be utilized by the second device to decode the compressed (e.g., encoded) frames and cropped frames in order to obtain the respective frames and cropped frames. It may be appreciated that the sequence of frames transmitted to the second device comprise partial frames, such as cropped frames determined on Step 125, or original frames, such as frames obtained from the first device in Step 100 and transmitted to the second device in Step 120, which may be encoded, compressed, or otherwise altered. It is noted that even the encoding utilizes lossy compression, potentially resulting in the decoded version of the encoded frame being different than the original frame, for the purposes of the present disclosure, such modified frame may be considered the same as the original frame. On Step 150, an alternative video may be displayed by the second device. In some exemplary embodiments, the alternative video may comprise a sequence of alternative frames and frames respective to the sequence of frames obtained from the first device (e.g. original sequence of frame). Each respective frame may be an alternative frame of a frame of the same order at the original sequence of frame, or the frame itself, depending on the decision on Step 110.

In some exemplary embodiments, the alternative video may be displayed to a user by utilizing a rendering device such as a screen or the like. It may be noticed that an encoded minimal shape may not reach the consumer due to packet loss, hardware failure, or the like. In that case the consumer may re-construct the frame based on a previous minimal shape associated with the same object of interest.

It may be noticed that Steps 100-150 may be performed for a duration of time in order to encode a movie, in order to transmit data from an outdoor camera, or the like.

Figure 1B:
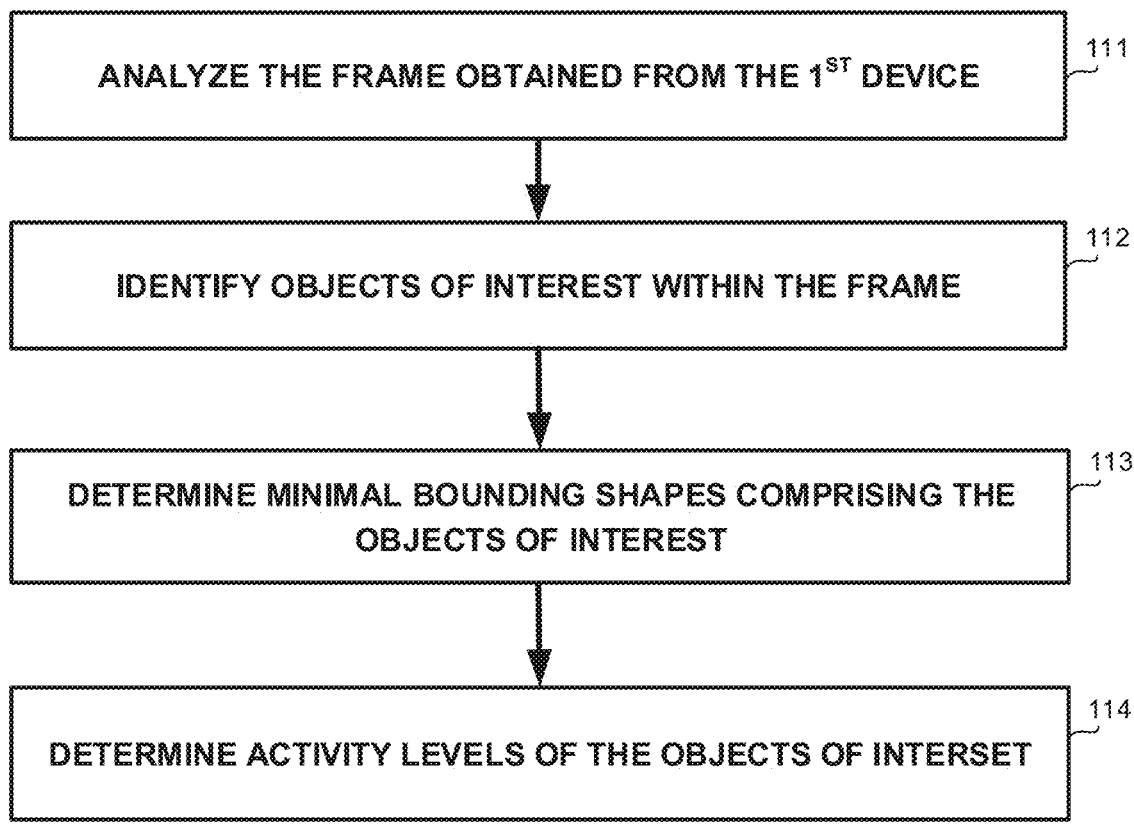

Referring now to FIG. 1B showing a flowchart diagram of a method, in accordance with some exemplary embodiments of the disclosed subject matter.

On Step 111, the frame obtained in Step 110 may be analyzed. In some exemplary embodiments, the frame may comprise a background and one or more objects of interest. The background may comprise static elements, e.g., elements that may not change from one frame to another, irrelevant items, e.g., non-static element that despite being changed from one frame to another, are not relevant to the video, the change is not important to the video, the element are not related to the context of the video, or the like.

On Step 112, the one or more objects of interest may be identified within the frame. An object of interest may be an image of a person, a face of a person, a dog, a car, or the like.

In some exemplary embodiments, analysis of the frame and the identification of the objects of interest may be performed in accordance with the context of the video. Referring to the previous example of the lectures, the lecturer and the slides viewers may be objects of interest. Other objects, such as static elements within the classroom, furniture, or the like, may be static or irrelevant to the context. As another example, the context may comprise a description of the media stream. The description may comprise the phrase "work meeting". Accordingly, a person in a work meeting may be tracked while other portions such as related to irrelevant moving objects (e.g., pets or the like) may be automatically omitted.

In some exemplary embodiments, the one or more objects of interest may be identified within the frame based on a previous identification of the one or more objects of interest or one or more objects related thereto in preceding frames. Referring again to the lectures example, a location of the slides viewer may be determined based on location thereof in the previous frames, the lecturer may be continuously tracked as an object of interest, or the like. Additionally or alternatively, a path of an object of interest with a series of frames may be determined. As an example, a person may be moving from one side of a room to the other side. In those embodiments, the frame may be cropped based on a prediction instead of re-detecting the object of interest within a frame comprised by the series of frames.

Additionally or alternatively, a set of objects that comprises the one or more objects of interest or one or more objects related thereto may be identified and tracked in the sequence of frames. Objects of interest within the set of objects may be determined, such as based on the context of the video. As an example, given that the video is a live lecture, an object of interest may be a lecturer, a board, a slide viewer, or the like. Other objects, such as a bird, a window, or the like, may be considered not to be objects of interest, in view of the context of the video. The identification of the set of objects may focus on finding such objects, tracking a location thereof, or the like.

Additionally or alternatively, object detection methods may be utilized to identify the one or more objects of interest. As an example, object detection algorithms, such as Single Shot MultiBox Detector, R-FCN (Object Detection via Region-based Fully Convolutional Networks), or the like, may be utilized in each frame or in portion of the frames. In some exemplary embodiments, a format of the frame may be adapted to the type of input that the object detection algorithm is configured to handle. As an example, some algorithms may be configured to perform detection in RGB (Red Green Blue) format, gray scale of the frame, or the like. Accordingly, the frame may be transformed to the specific type of input required to apply the relevant object detection algorithm thereon.

In some exemplary embodiments, a Machine Learning (ML) algorithm may be trained based on raw video data to identify one or more objects of interest, to determine for each frame whether to be transmitted in its entirety or the like. Training an algorithm based on raw video may yield better performance as there may not be a need to transform the frame to another format. In some exemplary embodiments, the raw video may be represented in a YUV format, or the like. A raw video format may comprise different channels for different types of colors, of gray, of light, or the like. The ML algorithm may be trained based on one channel. Training the algorithm based on one channel may yield faster learning time compared to an algorithm that is configured to work on an input comprising all the channels. Additionally or alternatively, identifying an object comprised by a frame may performed faster by an algorithm that is configured to work on one channel compared to an algorithm that is configured to work on an entire frame comprising all the channels.

In some exemplary embodiments, there may be more than one object of interest in the frame. A different media channel may be allocated in the media stream for each different object of interest. As an example, Charlie may join an ongoing video chat held by Alice and Bob. Two more media channels may be allocated for transmitting Charlie's audio and video. In a SIP-RTP based video chat, in order to add Charlie to the video chat, a SIP re-invite message may be transmitted to Alice. The re-invite message may comprise two SDP sections: one for Charlie's audio and another for Charlie's video. Similarly, each object of interest may be treated as a media source.

On Step 113, one or more bounding shapes that comprise the one or more objects of interest, may be determined in the frame. In some exemplary embodiments, the one or more bounding shapes may be determined based on one or more locations of the one or more objects of interest.

In some exemplary embodiments, the bounding shape may be a closed curved area such as a rectangle, ellipse, circle or the like, that comprises the one or more objects of interest. In some exemplary embodiments, each bounding shape may be associated with at least one object of interest. It may be appreciated that the bounding shape may be minimal with respect to a predetermined shape that can comprise the object of interest, such as a minimal rectangle comprising the object of interest. Accordingly, the curved area with lowest area may be selected as the bounding shape. In some exemplary embodiments, a certain type of shapes may be selected to simplify the reconstruction of the alternative frames, such as rectangles of different sizes, squares, or the like.

In some exemplary embodiments, each bounding shape may be a minimal bounding rectangle that comprises the one or more objects of interest. Any other rectangle comprising the one or more objects of interest may be larger than the minimal bounding rectangle.

In some exemplary embodiments, two or more objects of interest may be associated with the same bounding shape.

It may be appreciated that different objects of interest that define different bounding shapes may be associated with different SDPs. As an example, given that a second object of interest is determined in Step 113, e.g., a second person joining the meeting, the two persons in the meeting may be physically located together, and a single bounding shape may be determined for both of them, or may be separated and associated with different bounding shapes. A second SDP offer may be generated for the description (e.g. comprising anchor location) of the bounding shape associated with the second person. Additionally or alternatively, the second SDP offer may be associated with a bounding shape comprising both the first and the second object. The second SDP offer may be an addition to the SDP offer utilized for the first bounding shape, may replace the SDP offer, or the like. The alternative frame may be generated based on the second SDP offer.

In some exemplary embodiments, the bounding shape may encompass the object of interest as well as an area of the frame that corresponds to the area in which the object of interest was located in the last frame that was provided in its entirety. In some exemplary embodiments, such an embodiment ensures that if the object has moved since the last full frame that was preserved, cropped partial frame will overwrite the object in the past location, as depicted in the full frame, and will display it over the new location. If the pixels of the present frame that correspond to the location of the object in the previous frame are not included in the bounding shape, the object of interest may potentially be displayed twice in the frame that is constructed based on the cropped frame.

On Step 114, an activity level may be determined for each object of interest appearing in the frame. In some exemplary embodiments, the activity level may represent the difference in pixels of a bounding shape comprising the object of interest. The difference may be calculated based on a series of frames. Additionally or alternatively, the difference may be a difference in the location of a bounding shape comprising the object of interest. The difference in location may be calculated based on a series of frames. Additionally or alternatively, the activity level of an object may be determined based on a difference between a location of the object in the frame with respect to a location of the object in the preceding frame.

In some exemplary embodiments, an FPS parameter for each object of interest may be calculated based on a change in the activity level, based on a change in the change in the activity level, or the like. An SDP message may be generated. The SDP message may comprise the new FPS parameter associated with the object of interest. A SIP re-invite message comprising the SDP message may be sent to the second device. The frame may be cropped based on a bounding shape that is associated with the object of interest and may be transmitted based on the FPS parameter of the object of interest.

In some exemplary embodiments, a determination of which objects of interest to transmit may be determined based on the activity level thereon being above or below a predetermined threshold. As an example, given that the frame comprises a first object of interest and a second object of interest; and that the activity level of the first object of interest is below the predetermine threshold, while the activity level of the second object of interest is above the predetermined threshold; the second object (e.g., an associative bounding shape comprising the second object) may be transmitted while the first object may be excluded from the cropped frame.

Figure 2:
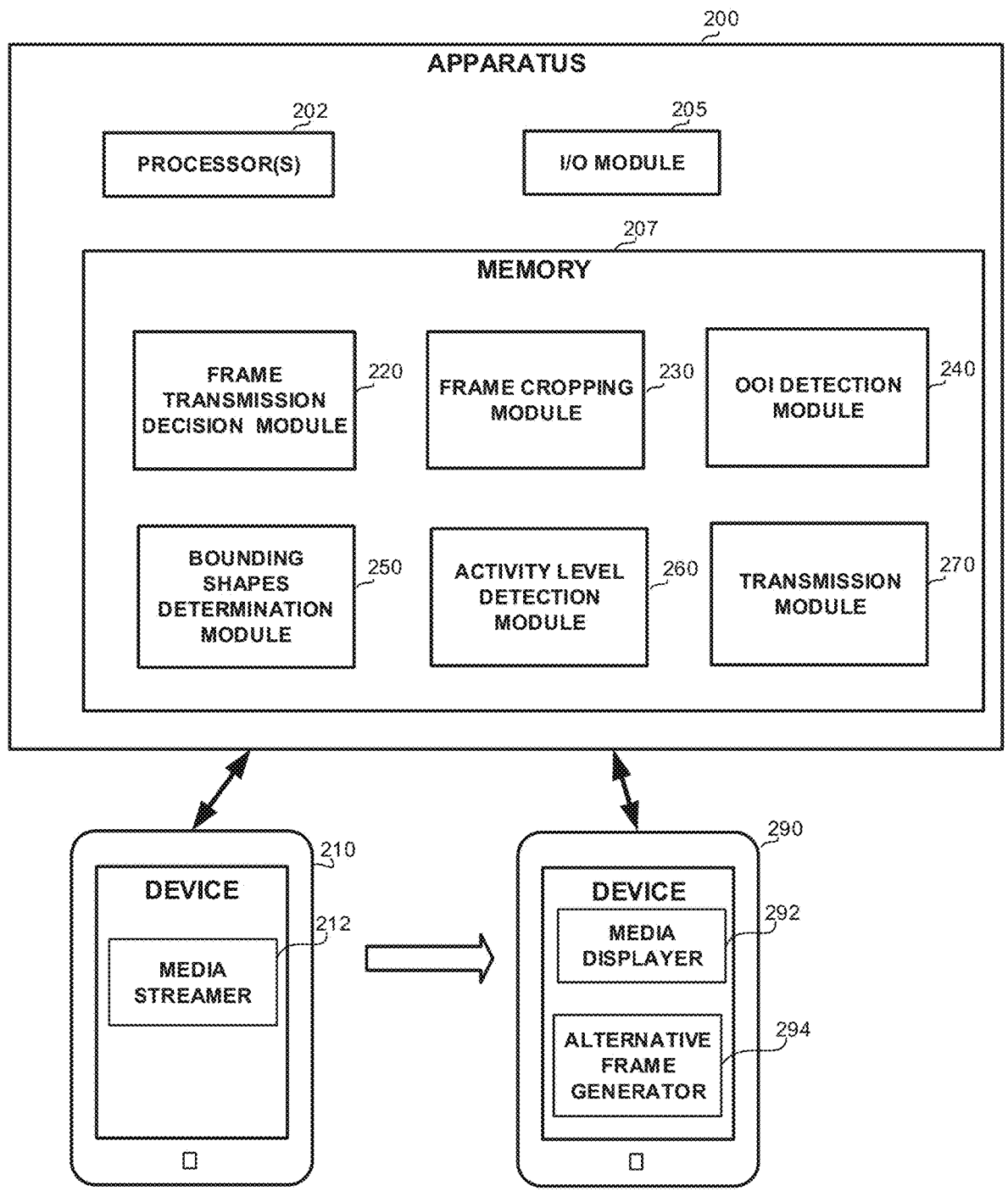
FIG. 2 shows a block diagram of an apparatus, in accordance with some exemplary embodiments of the disclosed subject matter.

Referring now to FIG. 2 showing a block diagram of an apparatus, in accordance with some exemplary embodiments of the disclosed subject matter.

In some exemplary embodiments, Apparatus 200 may be a computerized media stream provider configured to deliver media from a first device, such as Device 210, to a second device, such as Device 290. It is noted that some embodiments all or some of the components of Apparatus 200 may be included in Device 210, Device 290, combination thereof, or the like.

In some exemplary embodiments, Apparatus 200 may comprise one or more Processor(s) 202. Processor 202 may be a Central Processing Unit (CPU), a microprocessor, an electronic circuit, an Integrated Circuit (IC) or the like. Processor 202 may be utilized to perform computations required by Apparatus 200 or any of its subcomponents.

In some exemplary embodiments, Apparatus 200 may comprise an Input/Output (I/O) module 205. I/O Module 205 may be utilized to provide an output to and receive input from a user, such as, for example receiving video from a Device 210 and streaming video frames to Device 290, or the like.

In some exemplary embodiments, Apparatus 200 may comprise Memory 207. Memory 207 may be a hard disk drive, a Flash disk, a Random Access Memory (RAM), a memory chip, or the like. In some exemplary embodiments, Memory 207 may retain program code operative to cause Processor 202 to perform acts associated with any of the subcomponents of Apparatus 200.

In some exemplary embodiments, Device 210 may be configured to stream a video comprising a sequence of frames, such as using a Media Streamer 212. Device 210 may be a smartphone, a personal computer, an IoT device, or the like. Media Streamer 212 may be associated with an application installed on Device 210 and requiring to generate or transmit a video, such as a video generated by a video chat application. Additionally or alternatively, Media Streamer 212 may utilize a capturing device that is operatively coupled with Device 210 and configured to output a sequence of frames, such as a built-in camera, a webcam, an infra-red camera, an external camera, a street-camera, a camera integrated in an IoT device, a satellite camera, or the like. In some exemplary embodiments, Device 210 may be configured to stream the video to a second computerized device, such as Device 290. Additionally or alternatively, the video may be streamed from a server such as YouTube™, a VOD service, or the like. Additionally or alternatively, the video may be streamed in a video chat on application installed on Device 210, such as Zoom™, Skype™, WebEx™, or the like.

In some exemplary embodiments, a Frame Transmission Decision Module 220 may be configured to determine for each frame obtained from Device 210 whether to be transmitted in its entirety to Device 290 or to transmit a partial frame instead thereof. In response to determination to transmit a partial frame, Frame Transmission Decision Module 220 may be configured to instruct Frame Cropping Module 230 to generate a cropped frame.

In some exemplary embodiments, Frame Cropping Module 230 may be configured to crop frames obtained from Device 210 in response to instruction from Frame Transmission Decision Module 220, thereby to determine a cropped frame. The cropped frame may be smaller in at least one dimension than the second frame. In some exemplary embodiments, Frame Cropping Module 230 may be configured to crop a frame based on a bounding shape, such as determined by Bounding Shapes Determination Module 250. In some exemplary embodiments, the cropped frame may be accompanied by an anchor location representing the location of the cropped frame within the entire frame, such as representing a top-left (X,Y) position of the cropped frame in the entire frame. In some exemplary embodiments, the anchor location may be provisioned to the Frame Cropping Module 230, such as by the Bounding Shapes Determination Module 250 and may not necessarily be computed by Frame Cropping Module 230. For example, Object of Interest (OoI) Detection Module 240 may utilize an object detection algorithm, which may provide as an output the (X1, Y1, X2, Y2) location of the top-left and bottom-right corners of a bounding rectangle that encompasses the object of interest.

In some exemplary embodiments, Frame Cropping Module 230 may be configured to utilize Object of Interest (OoI) Detection Module 240, in order to determine the cropped frame. OoI Detection Module 240 may be configured to identify one or more objects within the frame, such as using object detection algorithms or the like. In some exemplary embodiments, OoI Detection Module 240 may be configured to identify the one or more objects of interest based on a context of the video. The context may be obtained from Device 210, from Device 290, may be automatically determined based on the application transmitting the video (such as a video meeting from a Zoom™ application), based on the audio of the video, based on spoken phrases within the video, or the like.

In some exemplary embodiments, OoI Detection Module 240 may be configured to utilize object detection algorithms or other context related detection algorithms, such as face detection algorithms, bird detection algorithms, or the like, in order to identify the one or more objects of interest. As an example, it may be determined, based on the context of the video, that the video is a national geographic video about birds. Accordingly, a bird detection algorithm may be applied, as birds can be objects of interest in accordance with the context of the video.

Additionally or alternatively, OoI Detection Module 240 may be configured to identify the one or more objects of interest based on a previous identification of the one or more objects of interest or one or more objects related thereto in preceding frames. Additionally or alternatively, OoI Detection Module 240 may be configured to detect a set of objects in the frame that comprises the one or more objects of interest or one or more objects related thereto, and continuously tracking locations of these objects over the frames. Additionally or alternatively, OoI Detection Module 240 may be configured to identify objects within the frames having an interest level above a predetermined threshold, thereby determine that they are objects of interest.

In some exemplary embodiments, OoI Detection Module 240 may be configured to utilize activity level of objects, as determined by Activity Level Detection Module 260, to determine whether an object is an object of interest. Activity Level Detection Module 260 may be configured to determine for each object in the frame an activity level. Objects with activity level above a predetermined threshold may be potential objects of interest. The determination to transmit a partial frame comprising a specific image may be performed based on the activity level of this specific object. Activity Level Detection Module 260 may be configured to determine the activity level of the object based on a difference between a location of the object in a current frame with respect to a location of the object in a frame (or alternative frame, cropped frame, or the like) preceding the current frame.

In some exemplary embodiments, OoI Detection Module 240 may be configured to utilize a confidence measurement relating to each identified object. In some cases, the object detection algorithm may identify several objects in the frame, with varying confidence measurements and sizes. OoI Detection Module 240 may select the object with the highest confidence measurement for analysis and avoid processing the remaining objects. In some cases, N objects with top confidence measurements may be processed. Additionally or alternatively, only objects with a confidence measurement above a threshold may be processed. Additionally or alternatively, objects with identified area below a minimal predetermined area may be ignored, such as small objects that are of represented by rectangles of size 8×8 pixels, 16×16 pixels, 16×64 pixels, or the like, may be ignored and not processed.

In some exemplary embodiments, Frame Cropping Module 230 may be configured to utilize a Bounding Shapes Determination Module 250, in order to determine the cropped frame. Bounding Shapes Determination Module 250 may be configured to determine at least one minimal bounding shape within the frame that comprises the one or more objects of interest identified by OoI Detection Module 240. The minimal bounding shape may be determined based on one or more locations of the one or more objects of interest within the frame. In some exemplary embodiments, the minimal bounding shape may be a minimal bounding rectangle that comprises the one or more objects of interest, such that any other rectangle comprising the one or more objects of interest is larger than the minimal bounding rectangle.

Frame Cropping Module 230 may be configured to crop the cropped frame based on the one or more minimal bounding shapes. In some exemplary embodiments, each object of interest may be processed individually and separately (e.g., resulting in several cropped frames for a single frame). Additionally, or alternatively, all object of interest may be processed together and encompassed by a single minimal bounding shape. In such an embodiment, a single cropped frame is transmitted per frame for which it was determined not to utilize the frame in its entirety. In some exemplary embodiments, each cropped frame may be processed individually and outputted when ready. For example, once the cropped frame is prepared it may be transmitted to a device such as Device 290, may be saved in a data storage associated with Apparatus 200 or Device 210, or the like.

In some exemplary embodiments, Transmission Module 260 may be configured to transmit the cropped frame and the anchor location to Device 290, such as via I/O Module 205, whereby avoiding to transmit a remainder portion of the original frame to Device 290.

In some exemplary embodiments, Device 290 may be configured to receive the cropped frame and the anchor location from Apparatus 200, and construct an alternative frame based thereon.

In some exemplary embodiments, an Alternative Frame Generator 294 may be utilized by Device 290 to reconstruct the alternative frame, based on the cropped frame, the anchor location and previous frames.

In some exemplary embodiments, Device 290 may display an alternative video, such as using Media Displayer 294. The alternative video may comprise a sequence of frames, comprising a mix of original frames and alternative frames generated based on the cropped frames.

It is noted that in some embodiments, Alternative Frame Generator 294 may be implemented on Device 210, and the alternative video generated thereby may be encoded to be retained locally or transmitted, such as via a streaming service, which uses a predetermined off-the-shelf encoder or another encoder that does not perform frame cropping as described by the present disclosure.

Figure 3:
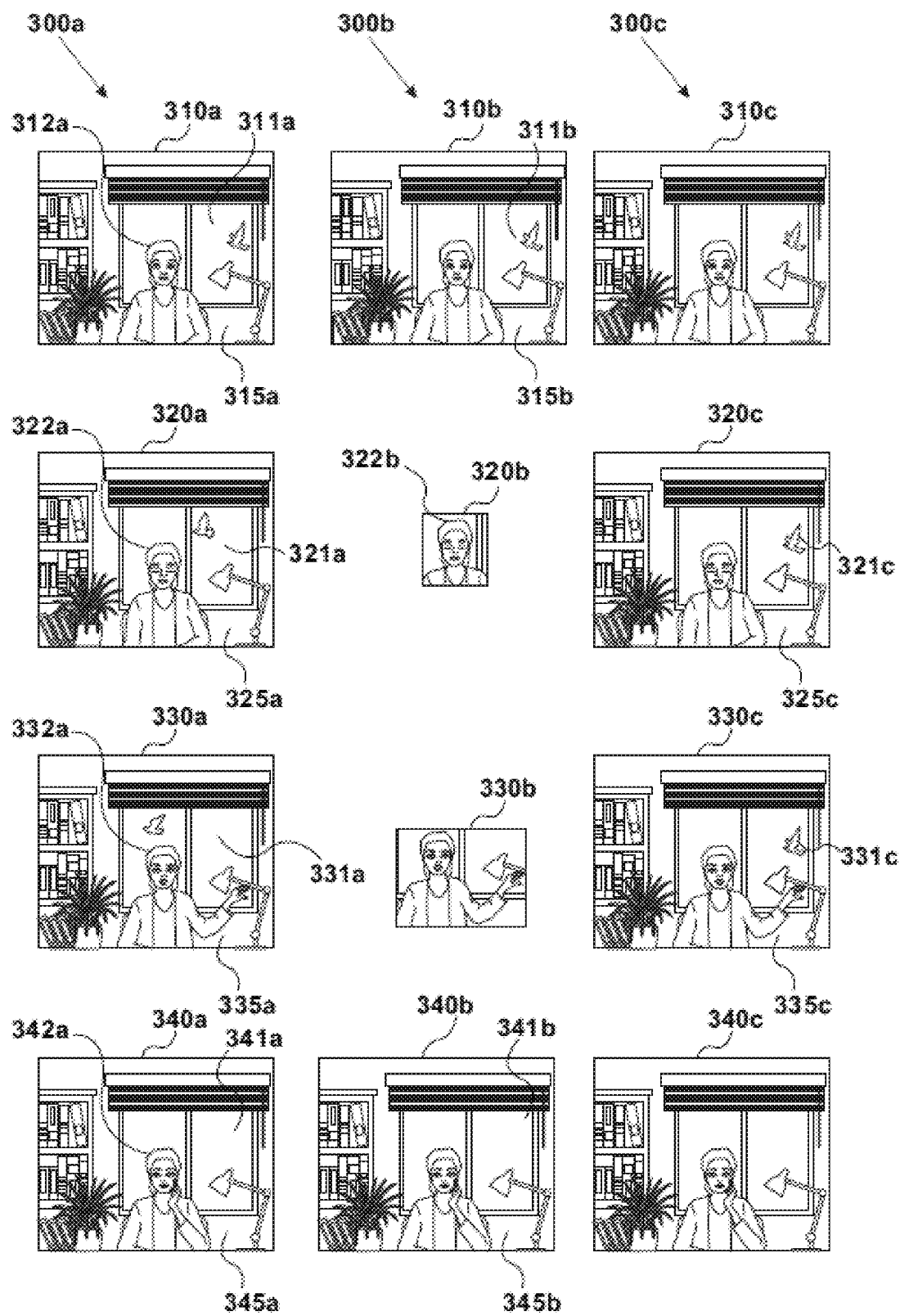
FIG. 3 shows a schematic illustration of sequences of frames, in accordance with some exemplary embodiments of the disclosed subject matter.

Referring now to FIG. 3 showing schematic illustrations of video frames, in accordance with some exemplary embodiments of the disclosed subject matter.

In some exemplary embodiments, a Sequence 300a of video frames (310a-340a) that is available at a first device. Sequence 300a may be a portion of a video being transmitted from the first device to a second device. Sequence 300b may be the sequence of frames/cropped frames (310b-340b) transmitted to the second device instead of Sequence 300a. Sequence 300c may be an alternative sequence of frames as displayed in the second device. It is noted that in some embodiments, Sequence 300b may not be transmitted, but rather locally utilized to generate Sequence 300c, which may be retained locally, encoded, or transmitted using a third-party streaming service.

In some exemplary embodiments, Sequence 300a may comprise a first Frame 310a, a second Frame 320a, a third Frame 330a and a fourth Frame 340a, depicted in accordance with their respective order. Each frame may comprise a background, such as Background 315a, 325a, 335a and 345a, and one or more objects of interest such as human face 312a, 322a, 332a and 342a. The background may comprise static elements that may not change from one frame to another, such as a desk, shelves with books behind the speaker, a planter, or the like; or elements that may change from one frame to another but may still not be associated with objects of interest, such as the view appearing from the window. The frames may comprise additional elements that are not static in the background, such as Bird 311a, 321a and 331a appearing in window while not appearing in Window 341a.

In some exemplary embodiments, Frames 310a and 340a may be determined to be transmitted in their entirety. The transmitted version thereof, 310b and 340b, may be similar to the frames as obtained from the first device, 310a and 340, and the frames displayed in the second device, 310c and 340c may be also similar to the frames as obtained from the first device, 310a and 340a.

In some exemplary embodiments, the determination whether to transmit the whole frame or portions thereof may be determined based on a network condition, based on the update rate of the frames, based on activity level of objects of interest within the frame, based on the size of the cropped frame configured to be transmitted instead of the frame, based on there not being a previously transmitted frame (at all or within a predetermined period), or the like. As an example, Frame 310a may be determined to be transmitted in its entirety as being the first frame in the sequence, and required for reconstruction of following frames. As another example, Frame 340a may be determined to be transmitted in its entirety as a randomly periodic selection of frames to be transmitted in their entirety, as having a big change in pixels comparing to previous frames (320a and 330a), as having a difference in pixels above a predetermined threshold comparing to the last frame transmitted in its entirety (e.g., Frame 310a), or the like.

In some exemplary embodiments, the determination may comprise identifying one or more objects of interest within the frame, and determining a minimal bounding shape comprising the one or more objects of interest. In some exemplary embodiments, the objects of interest in the frames may be determined based on a context of the video. As an example, the video may be transmitted in video conversation between the devices. According to this context, an object of interest may be a speaking person, a face of the speaking person, an upper portion of the body of the speaker, or the like. In some exemplary embodiments, this object of interest may be continuously tracked over the sequence of frames. As an example, Speaker 312a may be identified in Frame 310a, and may continuously be tracked in the following frames, e.g., 322a in 320a, 332a in 330a and 342a in 340a.

It may be noticed that Frames 310b and 340b transmitted to the second device comprise the Background (312b and 342b, respective to 312a and 342a), and other non-static elements within the background, such as the Bird 311b and Window 341b.

In some exemplary embodiments, Frames 320a and 330a may be determined to be cropped in order to transmit partial versions thereof instead of the frame as obtained from the first device. Frame 320a may be cropped to a Cropped Frame 320b, and Frame 330a may be cropped to a Cropped Frame 330b.

In some exemplary embodiments, the cropped frame may be determined based on a bounding rectangle comprising the one or more objects of interest of the respective frame. The bounding rectangle may be a minimal bounding rectangle that comprises the objects of interest. As an example, Cropped Frame 320b may be the minimal bounding rectangle surrounding the object of interest, Human Face 322b. In some exemplary embodiments, the cropped frame may comprise a single minimal bounding shape that comprises multiple objects of interest. As an example, the face of the lecturer in Frame 330a may be a first object of interest and the hand of the lecturer in Frame 330a may be a second object of interest. A bounding rectangle comprising both the Face 322b and the hand of the lecturer may be provided in Cropped Frame 330b. Additionally or alternatively, there may be multiple cropped frames each based on a separate minimal bounding shape, such as a first cropped frame consisting of bounding rectangle comprising the face of the lecturer (322b) and a second cropped frame consisting of bounding rectangle comprising the hand of the lecturer. Additionally or alternatively, in other embodiments, the hand of the lecturer may not be considered as an object of interest.

In some exemplary embodiments, an anchor location may be determined for each cropped frame. The anchor location may indicate an absolute location of the cropped frame (320b, 330b) within the original frame (320a, 330a). The anchor location may be transmitted to the second device to enable constructing an alternative frame based on the cropped frame (320c, 330c).

In some exemplary embodiments, Alternative Frame 320c may be constructed based on Cropped Frame 320b and Frame 310b. Alternative Frame 320c may be constructed by overlaying Cropped Frame 320b over Frame 310b at a location defined by the anchor position. Alternative Frame 320c may comprise the Cropped Frame 320b and elements from Frame 310b, such as the background 325c, the view from the window, including Bird 321c, or the like. As can be noted, Alternative Frame 320c may be different than Frame 320a, however, such difference may not affect the object of interest and may be irrelevant to the video. In some exemplary embodiments, Cropped Frame 320b may utilize lower resources to be transmitted than resources required to transmit Frame 320a. In some exemplary embodiments, resolution of the object of interest (e.g., 322a) may not be compromised even if network conditions would require resolution downgrade to transmit Frame 320a.

Additionally or alternatively, Alternative Frame 330c may be constructed based on Cropped Frame 330b and Frame 310b. Alternative Frame 330c may comprise the Cropped Frame 330b and elements from Frame 310b, such as the Background 335c, the view from the window, including Bird 331c, or the like. As can be noted, Alternative Frame 330c may be different than Frame 330a, however, such difference may not relate to the object of interest and may be irrelevant to the person viewing the video.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining, from a first device, a video, wherein the video comprises a sequence of video frames, wherein the sequence of video frames comprises at least a first frame and a second frame, wherein the first frame is chronologically ordered before the second frame in the sequence of video frames;
    determining to preserve the first frame in its entirety;
    determination to utilize a partial frame instead of the second frame; and
    in response to the determination to utilize a partial frame instead of the second frame:
        cropping the second frame to determine a cropped frame, wherein the cropped frame is smaller in at least one dimension than the second frame, wherein said cropping is based on an anchor location;
    whereby an alternative video can be constructed using the first frame and the cropped frame, wherein the alternative video does not include a remainder portion of the second frame.

2. The method of claim 1 further comprising:
    generating the alternative video based on the first frame, the cropped frame and the anchor location; and
    storing the alternative video in a data storage.

3. The method of claim 1 further comprising:
    constructing an alternative second frame based on the cropped frame and based on the first frame, wherein said constructing is performed based on the anchor location; and
    generating the alternative video, wherein the alternative video comprises the first frame and the alternative second frame.

4. The method of claim 1 further comprising:
    transmitting the first frame to a second device; and
    transmitting the cropped frame and the anchor location to the second device, whereby avoiding to transmit a remainder portion of the second frame to the second device.

5. The method of claim 1,
    wherein the second frame comprises a background and one or more objects of interest; wherein the determination to utilize the partial frame comprises: identifying the one or more objects of interest within the second frame; wherein the method comprises: determining a bounding shape within the second frame, wherein the bounding shape comprises the one or more objects of interest, wherein the bounding shape is determined based on one or more locations of the one or more objects of interest; and wherein said cropping comprises: cropping the second frame based on the bounding shape.

6. The method of claim 5, wherein the bounding shape is a minimal bounding rectangle that comprises the one or more objects of interest, wherein any other rectangle comprising the one or more objects of interest is larger than the minimal bounding rectangle.

7. The method of claim 5, wherein said identifying the one or more objects of interest comprises:
    detecting objects within the second frame;
    determining, for each detected object, a corresponding interest level; and
    identifying detected objects having the corresponding interest level above a threshold as the one or more objects of interest.

8. The method of claim 5, wherein said identifying the one or more objects of interest within the second frame is performed based on a previous identification of the one or more objects of interest or one or more objects related thereto in preceding frames.

9. The method of claim 5, wherein the first frame comprises the background.

10. The method of claim 5, wherein the one or more objects of interest comprise a first object and a second object; wherein the bounding shape comprises a first bounding shape and a second bounding shape, wherein the first bounding shape is separated from the second bounding shape; wherein said determining the bounding shape comprise:
    determining the first bounding shape within the second frame based on locations of the first and second objects, wherein the first bounding shape comprises the first object and excludes the second object;
    determining the second bounding shape within the second frame based on locations of the first and second objects, wherein the second bounding shape comprises the second object and excludes the first object; whereby an area of the first bounding shape and the second bounding shape is smaller than any other bounding shape comprising the first object and the second object; and wherein said cropping comprises:
    cropping the cropped frame based on the first and second bounding shapes, whereby the cropped frame comprises at least two separate portions.

11. The method of claim 1, selecting a subset of frames from the sequence of video frames to be considered for cropping, wherein the subset comprises the first frame and the second frame, wherein each frame that is excluded from the subset of frames, is utilized in its entirety.

12. An apparatus comprising:
    a processor and a memory; wherein said memory is configured to retain a video, wherein the video comprises a sequence of video frames, wherein the sequence of video frames comprises at least a first frame and a second frame, wherein the first frame is chronologically ordered before the second frame in the sequence of video frames;

determining to preserve the first frame in its entirety;

determination to utilize a partial frame instead of the second frame; and in response to the determination to utilize a partial frame instead of the second frame:

cropping the second frame to determine a cropped frame, wherein the cropped frame is smaller in at least one dimension than the second frame, wherein said cropping is based on an anchor location;

whereby an alternative video can be constructed using the first frame and the cropped frame, wherein the alternative video does not include a remainder portion of the second frame.

13. A system comprising said apparatus of claim 12 and a second device comprising a processor, wherein said apparatus and said second device are connectable over a network; wherein said apparatus is configured to transmit the first frame, the cropped frame and the anchor location to said second device, wherein said second device is configured to:

receive the first frame;

receive the cropped frame and the anchor location; and construct an alternative second frame based on the cropped frame, based on the first frame and based on the anchor location, thereby generating an alternative video that comprises the first frame and the alternative second frame.

14. A computer program product comprising a non-transitory computer readable medium retaining program instructions, which program instructions, when read by a processor, cause the processor to:

obtain retain a video, wherein the video comprises a sequence of video frames, wherein the sequence of video frames comprises at least a first frame and a second frame, wherein the first frame is chronologically ordered before the second frame in the sequence of video frames;

determining to preserve the first frame in its entirety;

determination to utilize a partial frame instead of the second frame; and in response to the determination to utilize a partial frame instead of the second frame:

cropping the second frame to determine a cropped frame, wherein the cropped frame is smaller in at least one dimension than the second frame, wherein said cropping is based on an anchor location;

whereby an alternative video can be constructed using the first frame and the cropped frame, wherein the alternative video does not include a remainder portion of the second frame.

* * * * *